June 4, 1935.  R. N. FALGE  2,003,804
LENS
Filed July 21, 1932  2 Sheets-Sheet 1
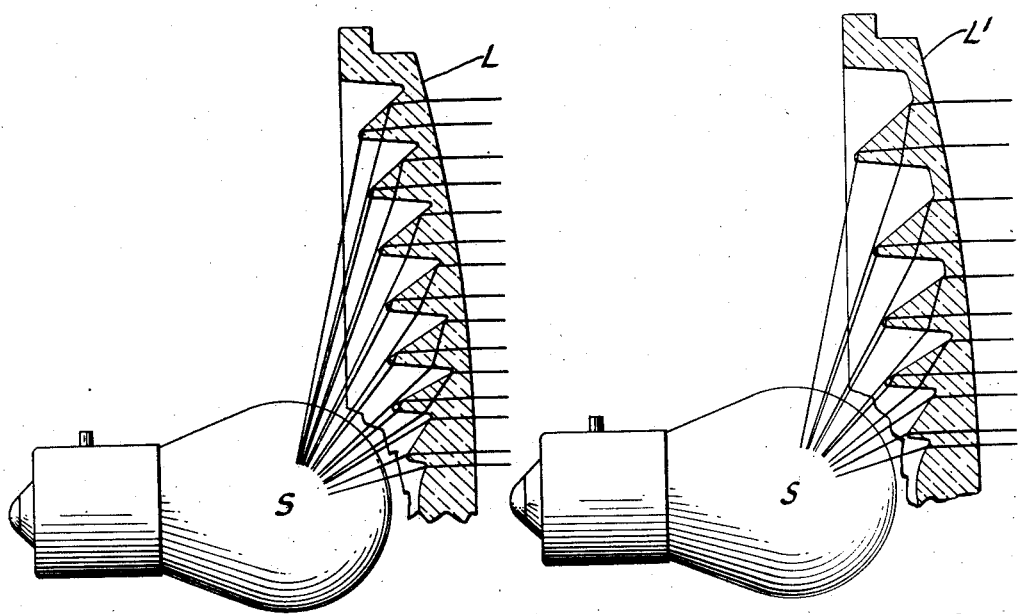
Fig. 1
Fig. 2
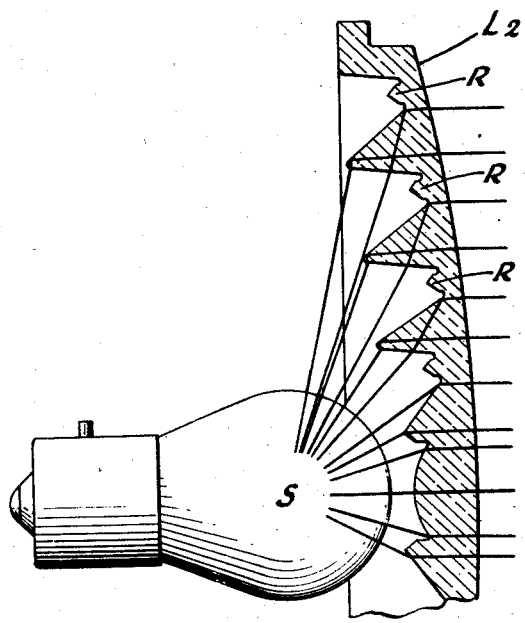
Fig. 3
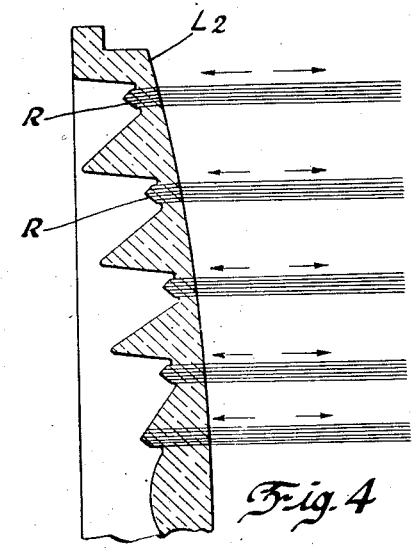
Fig. 4
Inventor
Robert N. Falge
By Blackmore, Spencer & Flint
Attorneys June 4, 1935.    R. N. FALGE    2,003,804
LENS
Filed July 21, 1932    2 Sheets-Sheet 2

Inventor
Robert N. Falge
By Blackmore, Spencer & Flint
Attorneys

Patented June 4, 1935

2,003,804

UNITED STATES PATENT OFFICE 2,003,804

LENS

Robert N. Falge, Birmingham, Mich., assignor, by mesne assignments, to General Motors Corporation, Detroit, Mich., a corporation of Delaware Application July 21, 1932, Serial No. 623,693

6 Claims. (Cl. 240—8.3)

This invention has to do with lenses for automobile lamps and particularly for use in the signal lamps used at the rear. The invention consists of a combination of transparent and back reflecting areas arranged close together so that when the lens is illuminated, either by an inside source, or an outside source, the effect of complete illumination of the entire area of the lens is obtained.

In the drawings:

Figure 1 is a diagrammatic view showing the light distribution effected by a typical catadioptric lens having short focal length.

Figure 2 is a similar view of a catadioptric lens of somewhat different design.

Figure 3 shows how the waste space of the lens of Figure 2 is used to incorporate back reflecting areas.

Figure 4 shows the optical action of the back reflecting areas of the lens of Figure 3.

In Figure 1, I have shown diagrammatically the distribution of light from a source at S effected by a catadioptric lens L of small focal length having the source at its focus. It will be noted that the central area of the lens is dioptric, that is, it projects the rays in a horizontal direction by virtue of refraction only, while the outer rings accomplish the same result by refraction plus internal reflection. The diagram also shows that the outer three catadioptric rings usefully intercept all light projected from the source to their inner surface, yet the reflecting surfaces of these rings are not being used to their full capacity. About two-thirds of the reflecting area of the extreme outer ring is being used, about three-fourths of the reflecting area of the second ring, and about five-sixths of the reflecting area of the third ring. The fourth, fifth and sixth catadioptric rings as well as the dioptric center fail to make use of all of the light available from the filament.

In Figure 2, I have shown a similar diagrammatic view of a catadioptric lens L' which is the equivalent of that shown in Figure 1. The sides and outer shape of the lens, focal length and total amount of intercepted light are the same as in the case of the lens of Figure 1. The catadioptric rings have been enlarged and reduced in number, and spaced so that each one is used to its full capacity. The efficiency of the lens is substantially the same as that of the lens of Figure 1. The large unused spaces between the rings, particularly the outer ones, will be noted.

Figure 7:
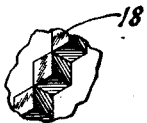
Figure 7 is a detail view showing one form of back reflecting configuration.

In Figure 3, I have shown a lens L2 of the same size, outer shape and focal length as the lens of Figure 2, but between the rings I have inserted rings of back reflecting configuration marked R. This configuration may take the form of corners of cubes, right angled cones, or other geometric shapes having the property of returning rays in a direction parallel to the direction of incidence. One form of configuration is shown in Figure 7; this ring consisting of corners of cubes. The two outer catadioptric rings are the same as the corresponding rings of the lens of Figure 2, the efficiency of this part of the lens being unchanged. The efficiency of the central part of the lens has been substantially reduced by inserting the back reflecting areas because it was necessary to eliminate one of the condensing rings, and increase the spacing between the remainder. However, even in this part of the lens a considerable portion of the waste space between rings is made use of to receive the back reflecting areas.

Figure 5:
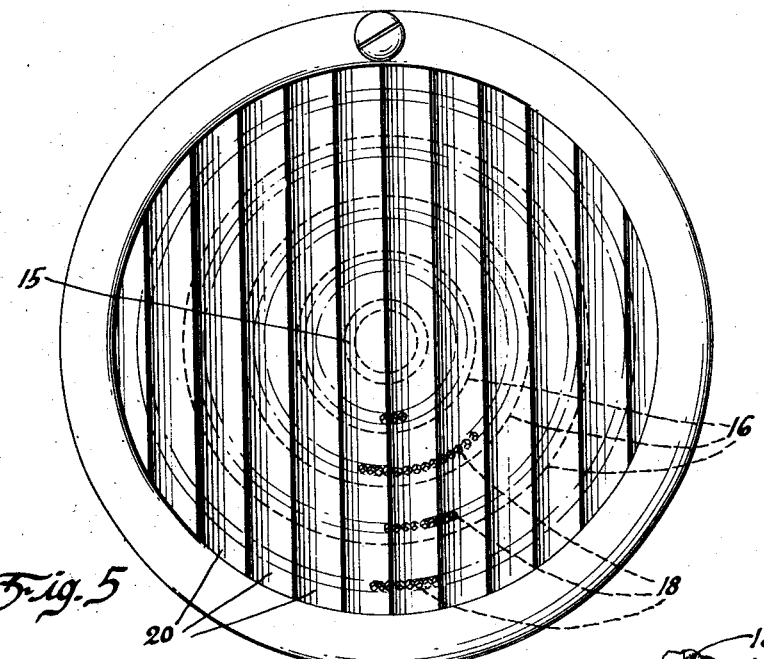
Figure 5 is a front view of a lamp embodying the lens of the type shown in Figures 3 and 4.
Figure 6:
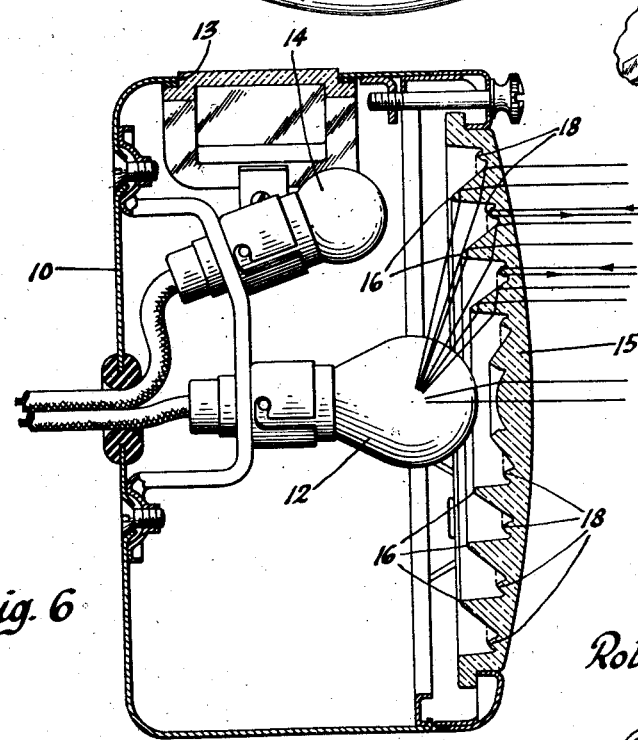
Figure 6 is a vertical section through the lamp of Figure 5.

It will now be apparent that by interposing rings of back reflecting configuration between dioptric and catadioptric rings of a lens the desired back reflecting action can be incorporated in the lens without substantial reduction in its efficiency as a projector. In Figure 4, I have illustrated the back reflecting action produced by the back reflecting rings of the lens L2, assuming that corners of cubes are used. The oppositely directed arrows indicate that for each incidence ray there is a corresponding reflected ray issuing in a parallel path and in an opposite direction. In Figures 5 and 6, I have illustrated a practical design of lamp embodying this principle.

The lamp may be of any suitable design. I have illustrated the housing at 10, a light source at 12. The housing may be provided with the usual aperture 13 for the projection of light from the tail lamp bulb 14 on the license plate. The lens consists of a central dioptric portion 15 surrounded by catadioptric rings 16. The rings 16 are separated by areas 18 which are of a configuration to produce back reflection, and are therefore, but slightly transmissive. By back reflection I mean that when the lens is subjected to rays from an outside source these areas 18 return the light by reflection to the vicinity of that source. The areas 18 may have the configuration of corners of cubes, right cones, or any other of the well known configurations having this property.

It will be noted that the areas of different configuration are separated from each other by but slight distances. The spacing should be such that at a comparatively short distance from the car, say 15 or 20 feet, and at any longer distance, the effect of a fully illuminated lens is obtained whether the bulb 12 be burning or whether it be extinguished, and the lens illuminated by light from an outside source. In either case the effect of full illumination of the lens is obtained by the operation of the well known optical principle that at a sufficient distance slightly separated configurations will give the effect of a solid area. This effect is enhanced by the fact that illuminated surfaces are characterized by a halo when viewed at some little distance. The overlapping effect of these halos assists in producing the effect of total illumination.

It will be understood, of course, that the area between the back reflecting rings may be given any configuration, although, of course, it must be transparent to permit light from the bulb 12 to pass through. I have chosen a catadioptric configuration for maximum efficiency. The "rings" may be of any shape desired, and if preferred, could take the form of parallel stripes, but the circular configuration is better because of the concentration of rays in the direction where they are most useful.

I have shown the lens provided with flutes 20 to give the desired spread to the beams.

I claim:

1. A signal lamp comprising a housing, a source of light in the housing, a lens over the housing comprising a plurality of lenticular rings provided with back reflecting configurations lying in the space between adjacent rings and being shielded by the rings from direct rays from the source, the lenticular rings distributing light from the source in the form of a signal beam, while the configurations return a signal beam when illuminated from an outside source.

2. A lamp comprising a housing, a source of light in the housing, a lens over the housing comprising a fresnel portion including an annular lenticular portion, catadioptric rings surrounding the fresnel portion, said lens being provided with back reflecting configurations lying in the space between adjacent rings and being shielded by the rings from direct rays from the source, said lens distributing light from the source in the form of a signal beam, while the configurations return a signal beam when illuminated from an outside source.

3. A lens for signal lamps having on the same side thereof a plurality of spaced catadioptric rings, and back reflecting configurations lying between said rings, said catadioptric rings concentrating light in the form of a substantially parallel signal beam while the configurations return a signal beam when illuminated from an outside source; said configurations being of small size in comparison with the catadioptric rings.

4. A signal lamp comprising a housing, a source of light in the housing, a lens over the housing having on the same side thereof a plurality of spaced catadioptric rings, and back reflecting configurations lying between said rings, said catadioptric rings concentrating light from the source in the form of a substantially parallel signal beam while the configurations return a signal beam when illuminated from an outside source; said configurations being of small size in comparison with the catadioptric rings.

5. A lens for signal lamps having on one side thereof a plurality of concentric arcuate catadioptric members adapted to concentrate light from a source on the same side of the lens into a beam of substantially parallel rays to give a high intensity signal, an arcuate member of back reflecting configuration lying between said members and on the same side of said lens and adapted to reverse the direction of rays projected upon the lens from a source on the other side of the lens and to concentrate said rays into a high intensity signal directed back to the vicinity of said outside source.

6. A lens for signal lamps having one side thereof formed to provide a Fresnel lens portion and a concentric arcuate catadioptric portion, said portions being adapted to concentrate light from a source on the same side of the lens into a beam of substantially parallel rays to give a high intensity signal, a concentric arcuate portion of back reflecting configuration lying between said portions and on the same side of said lens and adapted to reverse the direction of rays projected upon the lens from a source on the other side of the lens and to concentrate said rays into a high intensity signal directed back to the vicinity of said outside source.

ROBERT N. FALGE.